US011699121B2

(12) United States Patent
Salter et al.

(10) Patent No.: US 11,699,121 B2
(45) Date of Patent: Jul. 11, 2023

(54) SYSTEMS AND METHODS FOR EVALUATING LOADING AND UNLOADING TIMES OF ITEMS IN A VEHICLE

(71) Applicant: Ford Global Technologies, LLC, Dearborn, MI (US)

(72) Inventors: Stuart C. Salter, White Lake, MI (US); Kendra White, Redford, MI (US); Annette Huebner, Highland, MI (US); Pietro Buttolo, Dearborn Heights, MI (US)

(73) Assignee: Ford Global Technologies, TLC, Dearborn, MI (US)

( * ) Notice: Subject to any disclaimer, the term of this patent is extended or adjusted under 35 U.S.C. 154(b) by 143 days.

(21) Appl. No.: 17/063,015

(22) Filed: Oct. 5, 2020

(65) Prior Publication Data
US 2022/0108258 A1    Apr. 7, 2022

(51) Int. Cl.
*G06Q 10/06* (2023.01)
*G06Q 10/0639* (2023.01)
*G06Q 10/0832* (2023.01)
*G01G 19/08* (2006.01)
*G06Q 10/04* (2023.01)

(52) U.S. Cl.
CPC ....... *G06Q 10/06398* (2013.01); *G01G 19/08* (2013.01); *G06Q 10/04* (2013.01); *G06Q 10/0832* (2013.01)

(58) Field of Classification Search
CPC .................................................... G06Q 10/06
See application file for complete search history.

(56) References Cited

U.S. PATENT DOCUMENTS

| 9,928,749 B2 | 3/2018 | Gil et al. | |
| 2006/0106684 A1* | 5/2006 | Aoki | G06Q 10/08 705/28 |
| 2009/0143923 A1* | 6/2009 | Breed | B60R 21/01536 701/1 |

(Continued)

FOREIGN PATENT DOCUMENTS

WO    WO-2020053119 A1 *   3/2020   ........... G06Q 10/043

OTHER PUBLICATIONS

Chaithanya et al., "Object Weight Estimation From 2D Images", Sep. 2015, "ARPN Journal of Engineering and Applied Sciences", vol. 10, No. 17, pp. 7574-7578. (Year: 2015).*

*Primary Examiner* — Kurtis Gills
(74) *Attorney, Agent, or Firm* — Brandon Hicks; Eversheds Sutherland (US) LLP

(57) ABSTRACT

The disclosure is generally directed to evaluating loading and unloading times of items in a vehicle. The vehicle may be equipped with an object-sensing mat placed in a cargo area and coupled to a computer configured to execute a timing evaluation module. A first change in weight or pressure is sensed when an item is either placed upon, or removed from, the object-sensing mat. An increase in weight or pressure indicates loading of the item on to the vehicle, and vice-versa. The computer can generate a timing prediction model based on processing sensor signals from the object-sensing mat and determining the amount of time taken for loading or unloading items from the vehicle. In one application, a timing prediction model may be generated for each customer of a goods delivery service and used for optimizing delivery operations.

20 Claims, 7 Drawing Sheets

(56) References Cited

U.S. PATENT DOCUMENTS

| | | | |
|---|---|---|---|
| 2014/0067313 A1* | 3/2014 | Breed | G01P 15/02 |
| | | | 702/141 |
| 2018/0111698 A1* | 4/2018 | Podnar | B64F 1/368 |
| 2018/0251122 A1* | 9/2018 | Golston | B60W 50/0098 |
| 2018/0373236 A1 | 12/2018 | Ewert | |
| 2019/0062055 A1 | 2/2019 | Hance et al. | |
| 2020/0039766 A1* | 2/2020 | Haban | G06Q 10/047 |
| 2020/0239242 A1* | 7/2020 | Hoofard | G05D 1/0225 |
| 2021/0264225 A1* | 8/2021 | McCarson | G06V 20/188 |
| 2021/0316864 A1* | 10/2021 | Daw Perez | B64D 9/00 |

\* cited by examiner

SYSTEMS AND METHODS FOR EVALUATING LOADING AND UNLOADING TIMES OF ITEMS IN A VEHICLE

FIELD OF THE DISCLOSURE

This disclosure generally relates to vehicles, and more particularly relates to systems and methods for evaluating loading and unloading times of items in a vehicle.

BACKGROUND

A significant amount of effort is being put into developing automation directed at relieving human drivers of certain operations and in some cases replacing human drivers entirely. Relieving human drivers of operations can include providing equipment for performing actions, such as cruise control, automatic steering, automatic braking, and self-parking. Replacing human drivers with autonomous vehicles, for example, may be aimed at carrying out operations such as delivering groceries that have been ordered online, delivering packages that have been ordered online, and transporting goods from one city to another. The efforts towards replacing human drivers with autonomous vehicles are typically driven by factors, such as driver fatigue, driver availability, wages costs, accident reduction, and efficiency. However, eliminating the use of human drivers does not necessarily eliminate the participation of humans from other operations associated with goods delivery.

For example, workers, such as forklift operators and manual laborers, may be employed at a warehouse for loading, stacking, and unloading certain types of goods in a delivery vehicle. The work quality offered by such workers may vary from one worker to another based on various factors such as physical strength, stamina, and work ethic. Training these workers over a period of time may provide a certain amount of improvement in work efficiency when the workers in the warehouse are employees of an organization involved with carrying out the deliveries. However, such training may not be applicable when the person handling the goods is a member of the general public. For example, an autonomous vehicle that is used for delivering groceries may autonomously drive to a residence, and the resident may be informed (via text or email, for example) to take delivery of his/her package from the autonomous vehicle. In one case, the resident may be a person who is able to handle this task with relative ease and can quickly remove the package from the autonomous vehicle. In another case, the resident may be an individual who is physically handicapped and may take a longer amount of time to remove the package from the autonomous vehicle. The organization executing the deliveries may find it challenging to perform timing predictions and optimize delivery times based on such variances. It is therefore desirable to address such issues that may be associated with package deliveries using various types of vehicles.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
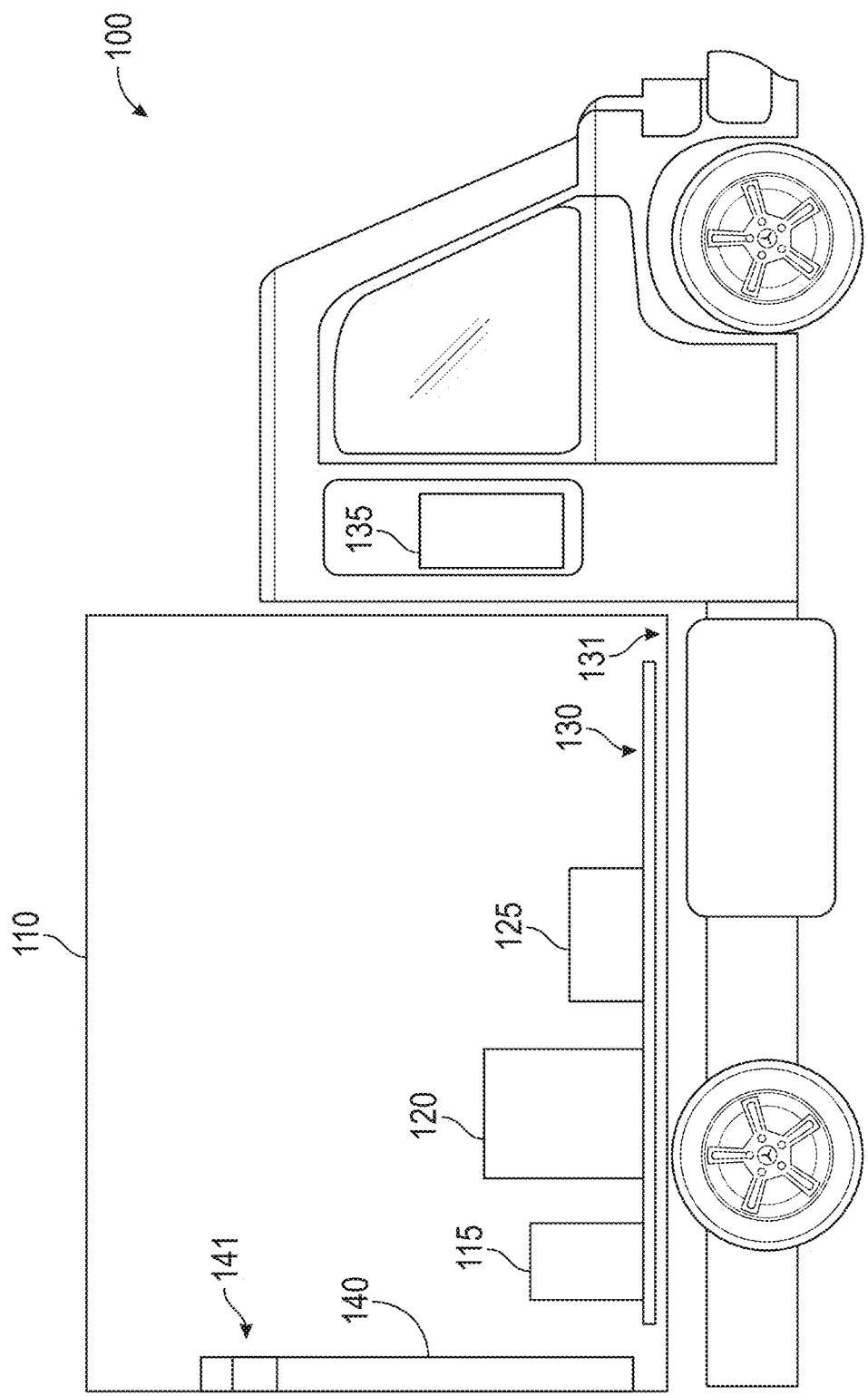
FIG. 1 illustrates an example vehicle configured to evaluate loading and/or unloading times of items in accordance with an embodiment of the disclosure.

In terms of a general overview, this disclosure is directed to systems and methods for evaluating loading and unloading times of items in a vehicle. In one example scenario, a vehicle is equipped with an object-sensing mat that is placed in a cargo area of the vehicle and coupled to a computer that is configured to execute a timing evaluation module. A first change in weight or pressure is sensed when an item is either placed upon or removed from the object-sensing mat. An increase in weight or pressure indicates loading of the item on to the vehicle. Conversely, a decrease in weight or pressure indicates unloading of the item from the vehicle. Multiple items may be loaded on to the vehicle or unloaded from the vehicle. The computer can generate a timing prediction model based on processing sensor signals received from the object-sensing mat for determining the amount of time taken for loading the items or for unloading the items. In one application, a timing prediction model may be generated for each customer of a goods delivery service and used for optimizing delivery operations.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. It should also be understood that the word "example" as used herein is intended to be non-exclusionary and non-limiting in nature.

Furthermore, certain words and phrases that are used herein should be interpreted as referring to various objects and actions that are generally understood in various forms and equivalencies by persons of ordinary skill in the art. For example, the phrase "object-sensing mat" as used herein generally pertains to a mat that provides a sensor signal upon sensing/detecting placement or removal of an object on/from the mat, based on parameters such as weight, pressure, size, and shape of the object. In various implementations, the object-sensing mat can include various types of sensors such as, for example, force sensors, pressure sensors, weight sensors, resistive sensors, electro-mechanical sensors, and capacitive sensors.

The words "pressure" and "weight" may be used interchangeably in some places in the disclosure, and it must be understood that "pressure" or "force" applied upon a portion of an "object-sensing mat" can be interpreted in terms of "weight" being applied at these points due to the action of gravity upon these elements when placed upon the "object-sensing mat." The word "vehicle" as used in this disclosure can pertain to any one of various types of vehicles such as cars, vans, sports utility vehicles, trucks, electric vehicles, gasoline vehicles, hybrid vehicles, and autonomous vehicles. More particularly, it must be understood that any description with respect to an autonomous vehicle can be equally applicable to other types of vehicles. The word "vehicle" as used in this disclosure can also pertain to any one of various other types of vehicles such as a train, a boat, or an airplane. The phrase "cargo bed" as used in this disclosure generally refers to any portion of a vehicle that can be used for placement of an object. For example, when the vehicle is a truck, the cargo area can be a flatbed portion of the truck that is located either in an enclosed section such as a cabin, or exposed to outside elements. As another example, when the vehicle is a car, van, or a sports utility vehicle (SUV), the cargo area can be a trunk of the vehicle, a roof of the vehicle, or a floor of a seating area of the vehicle. Certain words such as "sensing," "detecting," or "determining" may be used interchangeably and should be understood in the context of evaluating various parameters such as, for example, times, weight, pressure, shape, and footprint in accordance with the disclosure.

FIG. 1 illustrates an example vehicle 100 configured to evaluate loading and/or unloading times of items in accordance with an embodiment of the disclosure. The vehicle 100 may be one of various types of vehicles such as a gasoline powered vehicle, an electric vehicle, a hybrid electric vehicle, or an autonomous vehicle. In this example, the vehicle 100 is a delivery vehicle that is driverless and is used to deliver items such as groceries or packages. An object-sensing mat 130 is located upon a cargo bed 131 of the vehicle 100. Various items may be placed upon the object-sensing mat 130 by employees of the company that is operating the delivery service (a grocery store chain, for example) and unloaded by various customers who may have purchased the items online.

The object-sensing mat 130 is communicatively coupled to a computer 135 that is also located in the vehicle 100. In some applications, various functionalities of the computer 135 may be incorporated into a vehicle computer or an engine controller of the vehicle 100. The object-sensing mat 130 transmits a sensor signal whenever an item is either placed upon, or removed from, the object-sensing mat 130. The sensor signal may be transmitted to the computer 135 using various wired and/or wireless technologies. For example, the sensor signal may be transmitted to the computer 135 via a vehicle bus that uses a controller area network (CAN) bus protocol, a Media Oriented Systems Transport (MOST) bus protocol, and/or a CAN flexible data (CAN-FD) bus protocol. Some or all portions of the bus may be implemented using wireless technologies such as Bluetooth®, Ultra-Wideband, Wi-Fi, ZigBee®, or near-field-communications (NFC).

The vehicle 100 may include a door 140 that can be opened for loading items into the vehicle 100 and for unloading the items from the vehicle 100. A sensor 141 provided in the door 140 is communicatively coupled to the computer 135 and configured to send a door-opening sensor signal each time the door 140 is opened, and a door-closing sensor signal each time the door 140 is closed. Various other sensors and alerting devices may be provided for other purposes such as, for example, an alerting device that sounds an audible warning when an individual is exceeding a preset time threshold during loading or unloading of items from the vehicle 100.

The vehicle 100 may arrive at a loading location (a warehouse, for example) in an empty condition with no items placed upon the object-sensing mat 130. One or more workers begin loading items upon the object-sensing mat 130. For example, a worker may place an item 125 on the object-sensing mat 130 to begin the loading process. A processor in the computer 135 may start a timer at one of various predetermined instants, such as, for example, upon receiving a door-opening sensor signal when the door 140 of the vehicle 100 is opened to begin loading of the items at the loading location, when the engine of the vehicle 100 is turned off upon reaching the loading location, or after the first item (for example, item 125) is placed upon the object-sensing mat 130.

The timer may be used to identify various timing parameters such as, for example, a loading rate at which loading is taking place. The timing parameters may be determined by the processor by processing sensor signals received from the object-sensing mat 130 each time an item is placed upon the object-sensing mat 130 followed by placement of another item. For example, the processor may detect a first amount of time that has lapsed between loading of the item 125 and the item 120. The processor may then detect a second amount of time that has lapsed between loading of the item 120 and the item 115, and so on. The timing parameters can be used by the computer 135 (and/or a computer that is not a part of the vehicle 100) to generate a timing prediction model that provides information about loading timing characteristics.

In some instances, a timing prediction model may be generated for each person who loads items into the vehicle 100. For example, a timing prediction model may be generated for each worker at a warehouse and used for various purposes such as for scheduling, determining wages, and/or assignments.

In other instances, a timing prediction model may be generated for various entities, such as, for example, each vehicle that is operated on one or more delivery routes, each driver (when the vehicle 100 is not an autonomous vehicle or when the vehicle 100 is a vehicle operated by a driver of a ride hail service such as Uber® or Lyft®), each customer who is a recipient of an item transported in the vehicle 100, and based on characteristics of the items transported in the vehicle 100 (mail items, large packages, heavy packages, multiple loads, perishables, hazardous materials, groceries, emergency supplies, etc.).

In some cases, the computer 135 may refer to item related information stored in a database of the computer 135 and execute certain actions during a loading process. For example, the computer 135 may use the database to identify an expected weight of the item 120 or to detect a warning that an item to be loaded exceed a specified weight. Towards this end, the object-sensing mat 130 may detect a weight of an item when placed upon the object-sensing mat 130 and transmit a sensor signal that provides weight information to the computer 135. If the weight exceeds the expected weight or the specified weight, the computer 135 may activate an audible alarm (a beep, for example). In another case, the computer 135 may send a text message or email to a worker and/or the worker's supervisor alerting the worker and/or the supervisor of the infraction. The worker and/or the supervisor can then take measures to remedy the infraction, such as, for example, repacking the item into two packages or refraining from loading an additional item into the vehicle 100.

The vehicle 100 may arrive at an unloading location (another warehouse, for example) in a loaded condition with various items placed upon the object-sensing mat 130. One or more workers begin unloading the items from the object-sensing mat 130. For example, a worker may remove the 115 from the object-sensing mat 130 to begin the unloading process. A processor in the computer 135 may start the timer at one of various predetermined instants, such as, for example, upon receiving a door-opening sensor signal when the door 140 of the vehicle 100 is opened at the unloading destination, or when the engine of the vehicle 100 is turned off upon reaching the unloading location, or after an item (item 115, for example) has been removed from the object-sensing mat 130. A global positioning system (GPS) apparatus in the vehicle 100 may be used for identifying the unloading location at which the timer is started for evaluating the unloading procedure of the items from the vehicle 100.

The timer may be used to identify various timing parameters such as, for example, an unloading rate at which unloading is taking place. The timing parameters may be determined by the processor processing sensor signals received from the object-sensing mat 130 each time, an item is removed from the object-sensing mat 130. For example, the processor may detect a first amount of time that has lapsed between unloading of the item 115 and the item 120. The processor may then detect a second amount of time that has lapsed between unloading of the item 120 and the item 125, and so on.

The timing parameters can be used by the computer 135 (and/or a computer that is not a part of the vehicle 100) to generate a timing prediction model that provides information pertaining to unloading of items from the vehicle 100. In one example application, a timing prediction model may be generated for each person who unloads items from the vehicle 100. For example, a timing prediction model may be generated for each worker at the unloading location where items are unloaded for storage. The timing prediction model may be used for various purposes such as for scheduling, determining wages, and/or assignments. The timing prediction model for unloading items may be generated for various entities, such as, for example, each vehicle that is operated on one or more transportation routes, each customer who is a recipient of an item transported in the vehicle 100, and characteristics of the items transported in the vehicle 100 (mail items, large packages, heavy packages, multiple loads, perishables, hazardous materials, groceries, emergency supplies, etc.).

In some cases, during the unloading process, the computer 135 may refer to item-related information stored in a database of the computer 135 and execute certain actions. For example, the computer 135 may use the database to ensure that an item that has been removed from the object-sensing mat 130 is intended for the recipient at the unloading location (a customer who purchased the item, for example).

In some cases, the computer 135 may transmit information (text, email, etc.) to a personal device (smartphone, tablet, computer etc.) of an intended recipient of an item, prior to the vehicle 100 reaching the unloading location. For example, the information may be provided in the form of an alert that the item is heavy and that more than one person may be needed to unload the item from the vehicle 100. As another example, the information may be provided in the form of an alert to inform a customer that the item has been shipped in two or more separate packages due to various reasons such as weight, size, and/or different origination points.

In some cases, the computer 135 may alert the person unloading items from the vehicle 100 to unload at a faster rate. The alert may be provided in various ways, such as, for example, by a beeping sound emitted from a horn of the vehicle 100, a flashing dome light in a cargo section 110 of the vehicle 100, or a text message to a smartphone of the person.

Figure 2:
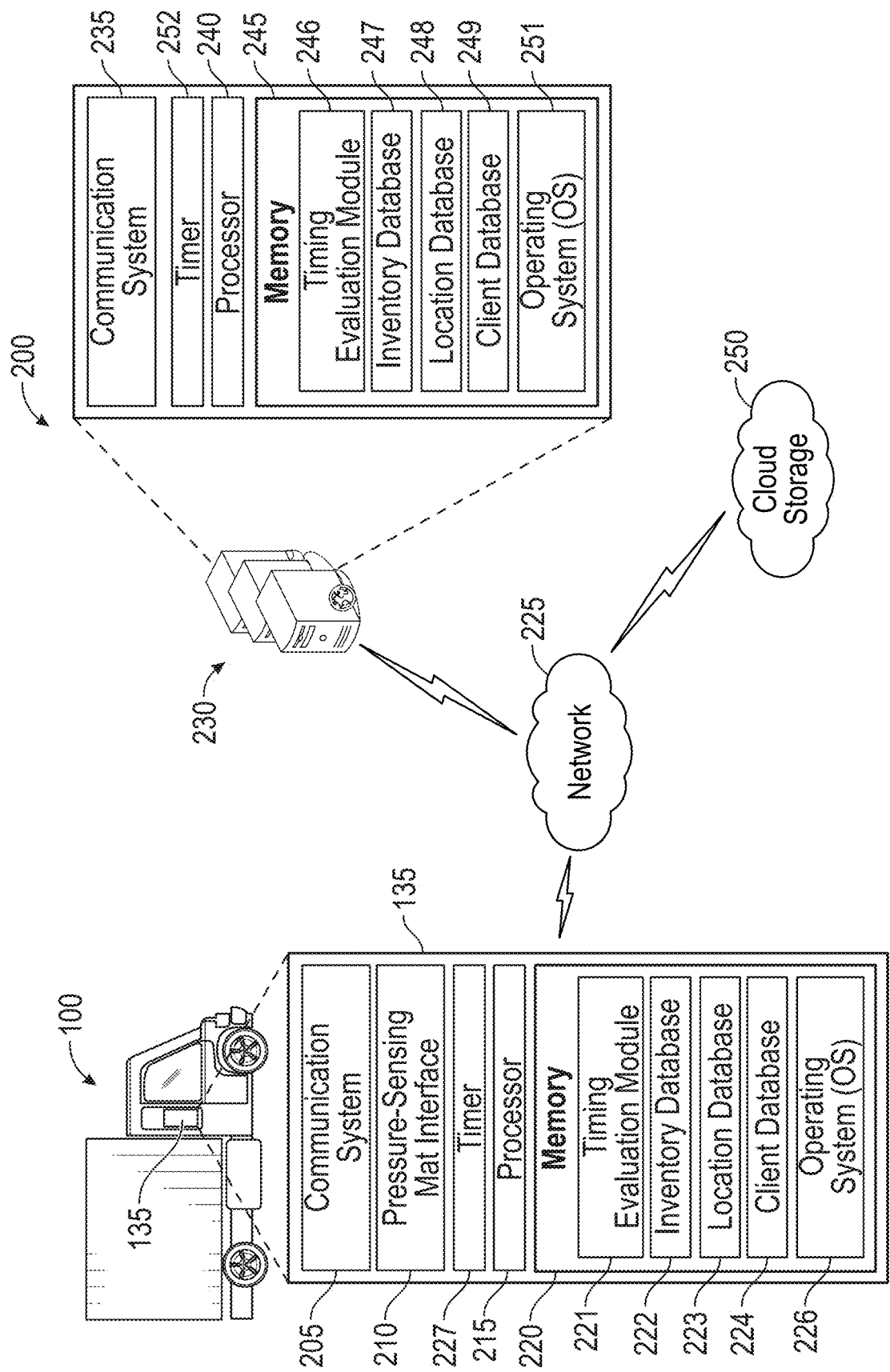
FIG. 2 illustrates a system for evaluating loading and/or unloading times of items in a vehicle in accordance with an embodiment of the disclosure.

FIG. 2 illustrates a system 200 for evaluating loading and/or unloading times of items in the vehicle 100 in accordance with an embodiment of the disclosure. The system 200 includes the computer 135 that is provided in the vehicle 100. The system 200 may also include a server computer 230 and cloud storage 250. The computer 135, the server computer 230, and cloud storage 250 are communicatively intercoupled to each other through a network 225. The network 225 may include any one network, or a combination of networks, such as a wide area network (WAN), a telephone network, a cellular network, a cable network, a wireless network, and/or private/public networks such as the Internet. For example, the network 225 may support communication technologies such as Bluetooth®, cellular, near-field communication (NFC), Wi-Fi, Wi-Fi direct, Li-Fi, machine-to-machine communication, and/or man-to-machine communication. At least one portion of the network 225 includes a wireless communication link that allows the computer 135 to wirelessly communicate with the server computer 230 and/or cloud storage 250.

The computer 135 includes some example components such as a communication system 205, an object-sensing mat interface 210, a timer 227, a processor 215, and a memory 220. The communication system 205 can include one or more wireless transceivers, such as, for example, a Bluetooth® Low Energy Module (BLEM), that allows the computer 135 to transmit and/or receive various types of signals to/from various elements in the vehicle 100 such as, for example, the sensor 141 in the door 140, the dome light in the cargo section 110, the horn, and the GPS apparatus. The communication system 205 can also include hardware for communicatively coupling the computer 135 to the network 225 for carrying out communications and data transfers with the server computer 230 and cloud storage 250.

The object-sensing mat interface 210 includes hardware such as, for example, a wireless system or a wired signal input/output interface, for receiving sensor signals from the object-sensing mat 130. The sensor signals may be processed by one or more code modules stored in the memory 220.

The timer 227 may be used by the processor 215 for determining various timing parameters when evaluating loading and unloading of items in the vehicle 100 in accordance with the disclosure.

The memory 220, which is one example of a non-transitory computer-readable medium, may be used to store an operating system (OS) 226 and various code modules such as a timing evaluation module 221. The code modules are provided in the form of computer-executable instructions that can be executed by the processor 215 for performing various operations in accordance with the disclosure. The memory 220 may also be used to store data and other information, such as, for example, in the form of an inventory database 222, a locations database 223, and a client database 224.

The inventory database 222 may contain information about items expected to be loaded or unloaded from the vehicle 100, items that have been loaded on to the vehicle 100, items that have been unloaded on to the vehicle 100, and characteristics of one or more items (weight, shape, size, number of packages, etc.).

The locations database 223 may contain information about various locations such as, for example, loading locations (warehouse, store, shop, etc.) and unloading locations (warehouse, residence, office, store, etc.) for the various items transported in the vehicle 100.

The client database 224 may include information about various clients such as individuals who have ordered items online, stores where items have to be loaded or unloaded, and personnel at loading and/or unloading locations that have to be informed of various events and conditions (via text or email, for example).

The timing evaluation module 221 may be executed by the processor 215 for performing various operations related to evaluating loading and/or unloading times of items in the vehicle 100 in accordance with the disclosure. In an example procedure, the processor 215 receives a door-opening sensor signal from the sensor 141 provided in the door 140 of the vehicle 100. The processor 215 executes the timing evaluation module 221 (if not already being executed) and may use the communication system 205 to obtain location coordinates from the GPS apparatus in the vehicle 100. The location coordinates may be compared with information stored in the locations database 223 and the client database 224 in order to verify whether the vehicle 100 is stopped at a specified location for loading items into the vehicle 100 and/or for unloading items from the vehicle 100.

Upon confirming that the vehicle 100 is stopped at a specified location, the timing evaluation module 221 evaluates loading and/or unloading times of items in the vehicle 100 by performing various actions. These actions may include determining various timing parameters such as a loading rate at which loading is taking place or an unloading rate at which unloading is taking place. The timer 227 may be used by the processor 215 for this purpose.

In one example application, the processor 215 generates a timing prediction model based on the timing parameters. In another example application, the processor 215 cooperates with the communication system 205 to transmit the timing parameters to the server computer 230. The server computer 230 may use the timing parameters to generate a timing prediction model. The processor 215 may also cooperate with the communication system 205 to transmit the timing parameters and other information, such as, for example, location information and client information, to cloud storage 250. The cloud storage 250 may be accessed by the server computer 230 and/or other devices to fetch the stored information for various purposes, such as, for example, to generate the timing prediction model, for scheduling, and for determining wages.

The server computer 230, which may include a single computer or multiple computers, can include various components that are substantially similar to those provided in the computer 135. For example, the server computer 230 may include a communication system 235, a timer 252, a processor 240, and a memory 245. The memory 245, which is another example of a non-transitory computer-readable medium, may be used to store an operating system (OS) 251 and various code modules such as a timing evaluation module 246. The timing evaluation module 246 may execute some or all functions described above with reference to the timing evaluation module 221 that is stored in the memory 220 of the computer 135 in the vehicle 100. The memory 245 may also be used to store data and other information, such as, for example, in the form of an inventory database 247, a locations database 248, and a client database 249. Information stored in these databases may pertain not only to the computer 135 and the vehicle 100, but to various other computers and vehicles as well (such as various vehicles in a fleet of vehicles).

Figure 3:
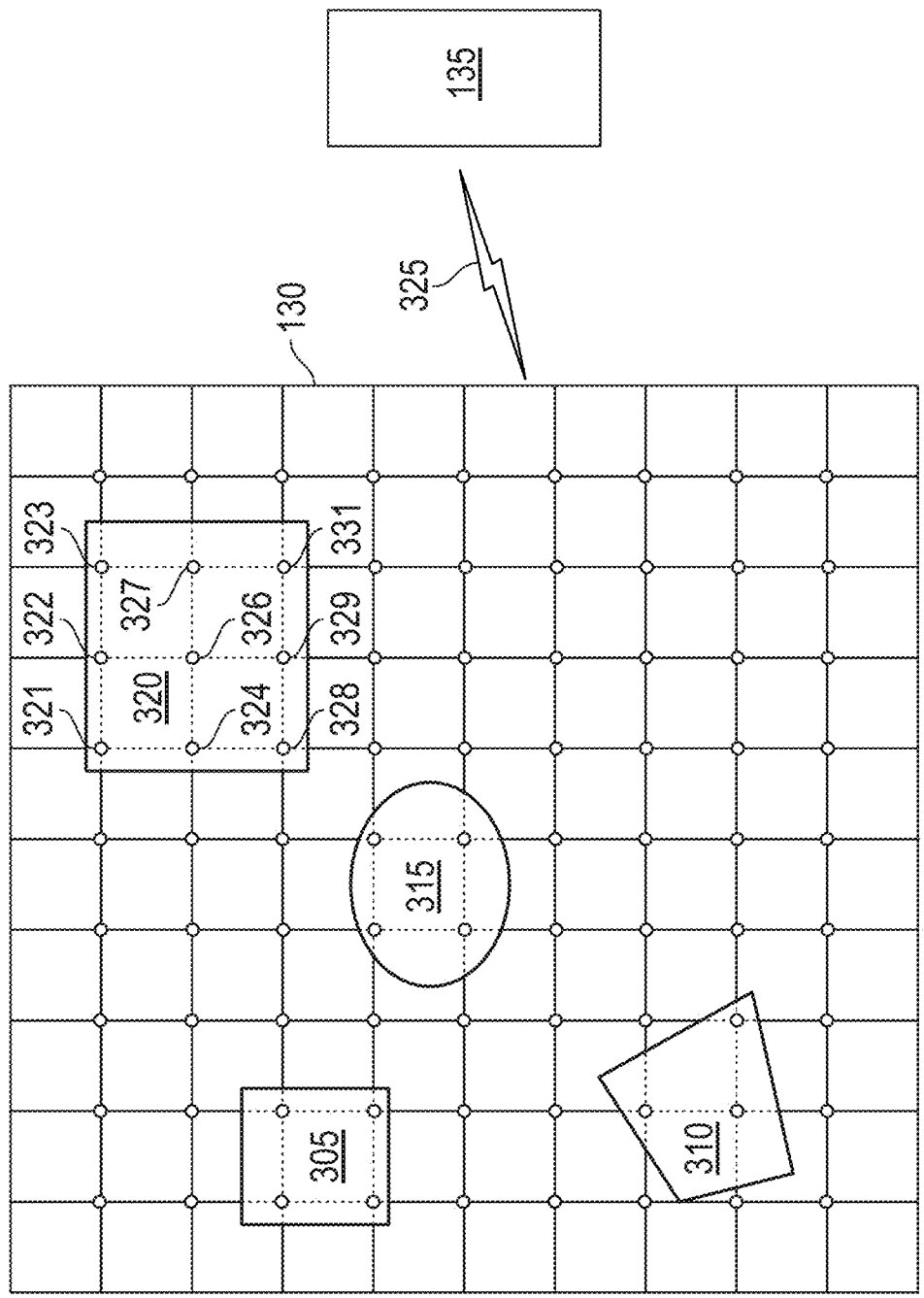
FIG. 3 illustrates an example object-sensing mat that can be a part of a timing evaluation system for evaluating loading and/or unloading times of items in a vehicle in accordance with the disclosure.

FIG. 3 illustrates an example implementation of the object-sensing mat 130 that is communicatively coupled to the computer 135 provided in the vehicle 100. In this implementation, the object-sensing mat 130 incorporates a set of pressure sensors (or weight sensors) arranged in a grid pattern. In other implementations, the pressure sensors may be arranged in various other ways. The items placed upon the object-sensing mat 130 can have different weights and shapes.

The computer 135 can determine certain characteristics of an item (weight, shape, etc.) and a location of the item upon the object-sensing mat 130 by processing sensor signals received from the pressure sensors upon which the item has been placed.

For example, the computer 135 can determine certain characteristics of an item 320 (weight, shape, etc.) by processing signals received from nine pressure sensors upon which the item 320 has been placed (pressure sensor 321, pressure sensor 322, pressure sensor 323, pressure sensor 324, pressure sensor 326, pressure sensor 327, pressure sensor 328, pressure sensor 329, and pressure sensor 331).

The computer 135 can also determine a location of the item 320 on the object-sensing mat 130 by using a priori information about the sensor layout. In this example, the computer 135 may use information of the grid pattern and the characteristics of the sensors of the object-sensing mat 130. The computer 135 thus is aware of where the nine sensors are located on the object-sensing mat 130 and a signal strength of a sensor signal produced by each of the sensors. If the item 320 has a non-uniform weight distribution, the sensor signals produced by the nine sensors will correspond to the non-uniform weight distribution of the item 320.

Similarly, the computer 135 may process other sensor signals to determine characteristics and location information of other items placed upon the object-sensing mat 130, such as an item 305, an item 315, and an item 310. In the example illustration, information about the item 305 can be determined by processing sensor signals received from four pressure sensors upon which the item 305 has been placed. Information about the item 315 can be determined by processing sensor signals received from four other pressure sensors upon which the item 315 has been placed. Information about the item 310 can be determined by processing sensor signals received from three other pressure sensors upon which the item 310 has been placed. More particularly, a shape of the item 310 may be determined based on receiving sensor signals from the three sensors upon which the item 310 has been placed.

Figure 4:
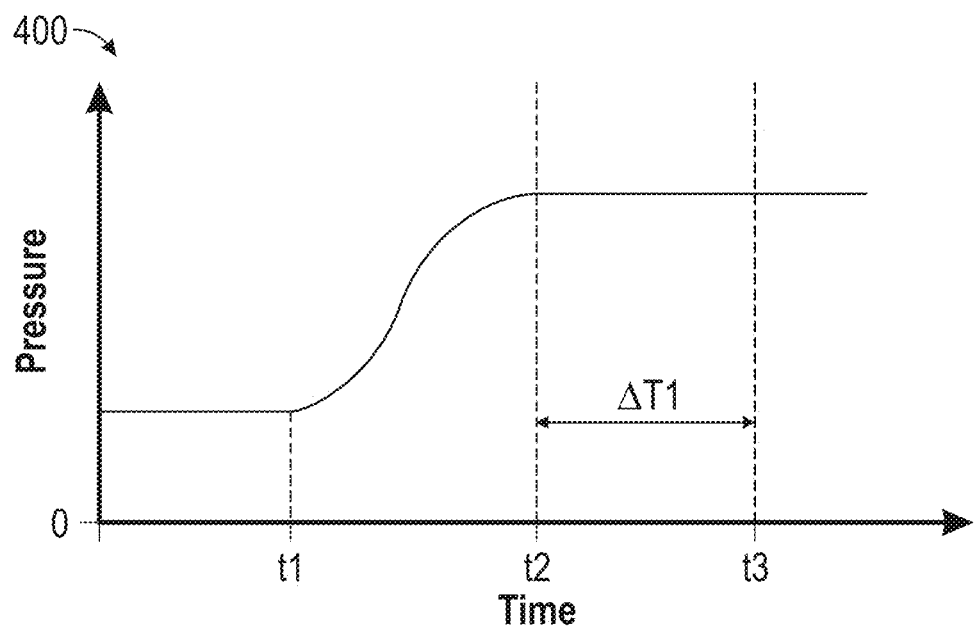
FIG. 4 shows a graph of a pressure vs. time characteristic of a signal produced by a sensor of an object-sensing mat when an item is placed upon the object-sensing mat.

FIG. 4 shows a graph 400 of a pressure vs. time characteristic of a sensor signal produced by a sensor when an item is placed upon the object-sensing mat 130. The graph 400 provides an indication of an amount of pressure (or weight) applied by the item upon the sensor when the item is placed upon the object-sensing mat 130. The sensor may produce a sensor signal having a signal strength that corresponds to the amount of pressure applied upon the sensor by the item. A period of time extending up to "t1" corresponds to a period when the item has not yet been placed upon the object-sensing mat 130. The period of time extending from "t1" to "t2" indicates a change in pressure taking place as the item is being placed upon the object-sensing mat 130. During this time period, a worker may be bearing a portion of the weight of the item and may have placed one corner (or edge) of the item upon the object-sensing mat 130. Consequently, an entire weight of the item has not yet been transferred on to the object-sensing mat 130. At time "t2" the entire weight of the item bears down upon the object-sensing mat 130. The computer 135 processes signals received from the sensor to detect these various conditions during placement of the item on the object-sensing mat 130. The computer 135 may detect that a stable condition has been reached after the item has been placed upon the object-sensing mat 130 by identifying a constant weight (or pressure) applied upon the sensor over a time period "ΔT1."

Figure 5:
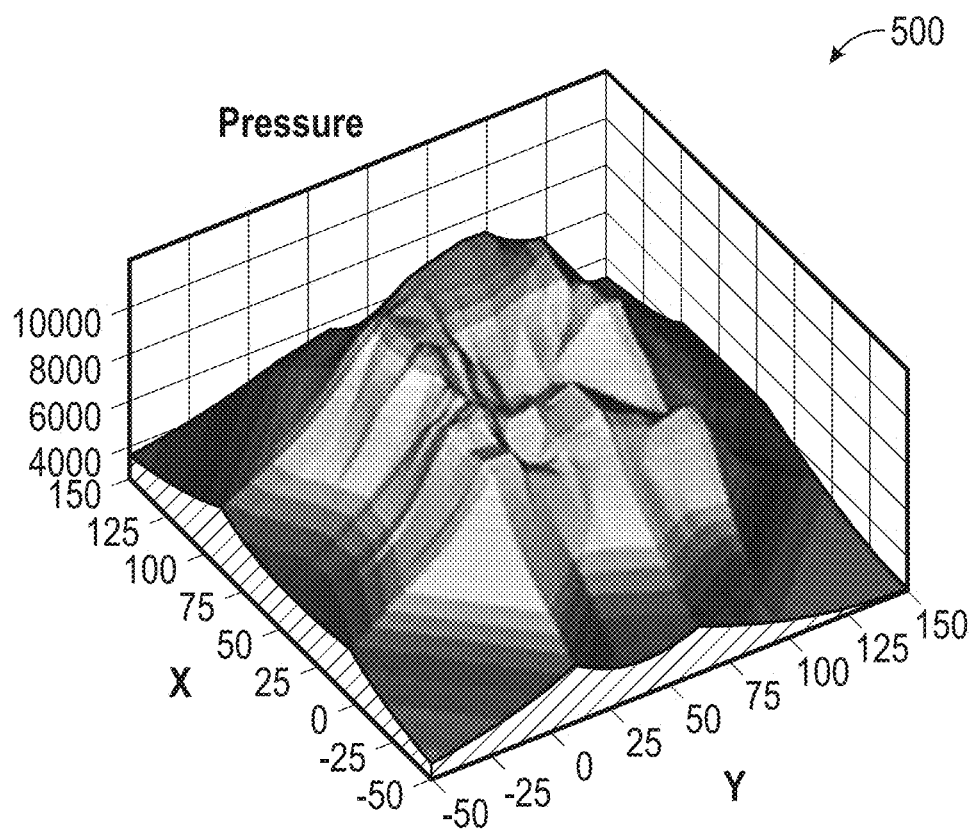
FIG. 5 shows a 3D pressure distribution map that may be generated by a computer based on processing sensor signals received from a set of sensors when one or more items are placed upon an object-sensing mat.

FIG. 5 shows a 3D pressure distribution map 500 that may be generated by the computer 135 based on processing sensor signals received from a set of sensors when several items are placed upon the object-sensing mat 130. In one example implementation, each "hill" corresponds to a pressure distribution (or weight distribution) of an individual item placed upon the object-sensing mat 130. The number of "hills" provides an indication of the number of items placed upon the object-sensing mat 130 and the weight characteristics of these items.

Various timing parameters associated with loading of the items upon the object-sensing mat 130 may be determined based on detecting the time instants "t1," "t2," and "t3" and the amount of weight (or pressure) applied upon each sensor of the set of sensors over the time period "ΔT1" described above. The timing parameters can be used by the computer 135 to generate a timing prediction model in accordance with the disclosure.

Figure 6:
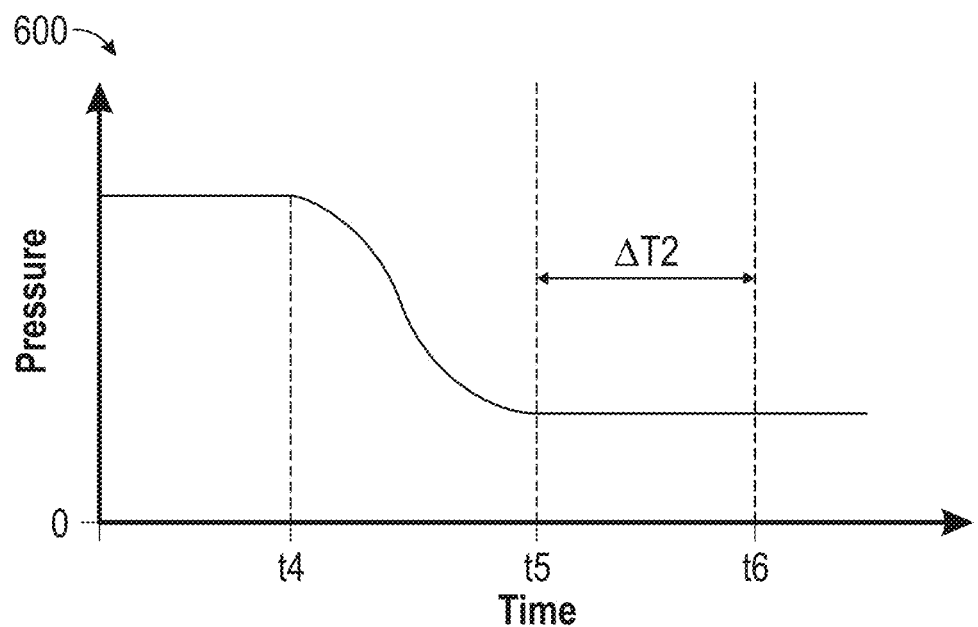
FIG. 6 shows a graph of a pressure vs. time characteristic of a signal produced by a sensor of an object-sensing mat when an item is removed from the object-sensing mat.

FIG. 6 shows a graph 600 of a pressure vs. time characteristic of a signal produced by a sensor when an item is removed from the object-sensing mat 130. The graph 400 provides an indication of a decrease in an amount of pressure (or weight) when the item is removed from the object-sensing mat 130. In this case, a period of time extending up to "t4" corresponds to a period when the item has not yet been removed from the object-sensing mat 130 and an entire weight of the item is bearing down upon the sensor. The period of time extending from "t4" to "t5" indicates a change in pressure taking place as the item is being lifted from the object-sensing mat 130. During this time period, a worker may be bearing a portion of the weight of the item and one corner (or edge) of the item is still resting upon the object-sensing mat 130. Consequently, an entire weight of the item has not yet been lifted from the object-sensing mat 130. At time "t5" the item has been completely lifted from the object-sensing mat 130.

The computer 135 processes signals received from the sensor to detect these various conditions during removal of the item from the object-sensing mat 130. For example, the computer 135 may detect that the item has been removed from the object-sensing mat 130 by detecting a steady state reduction in weight (or pressure) applied upon the sensor over a time period "ΔT2."

Various timing parameters associated with unloading of the items from the object-sensing mat 130 may be determined based on detecting the time instants "t4," "t5," and "t6" and a reduction in the amount of weight (or pressure) applied upon each sensor of the set of sensors over the time period "ΔT2." The timing parameters can be used by the computer 135 to generate a timing prediction model in accordance with the disclosure. In some cases, the timing parameters may indicate a characteristic of an individual who is removing items from the object-sensing mat 130. For example, longer delay between "0" and "t4" and/or a longer delay between "t4" and "t5" may indicate that a physically handicapped individual or an older individual is removing an item from the object-sensing mat 130. In one example implementation, the computer 135 may transmit an alert upon detecting the longer delay.

Figure 7:
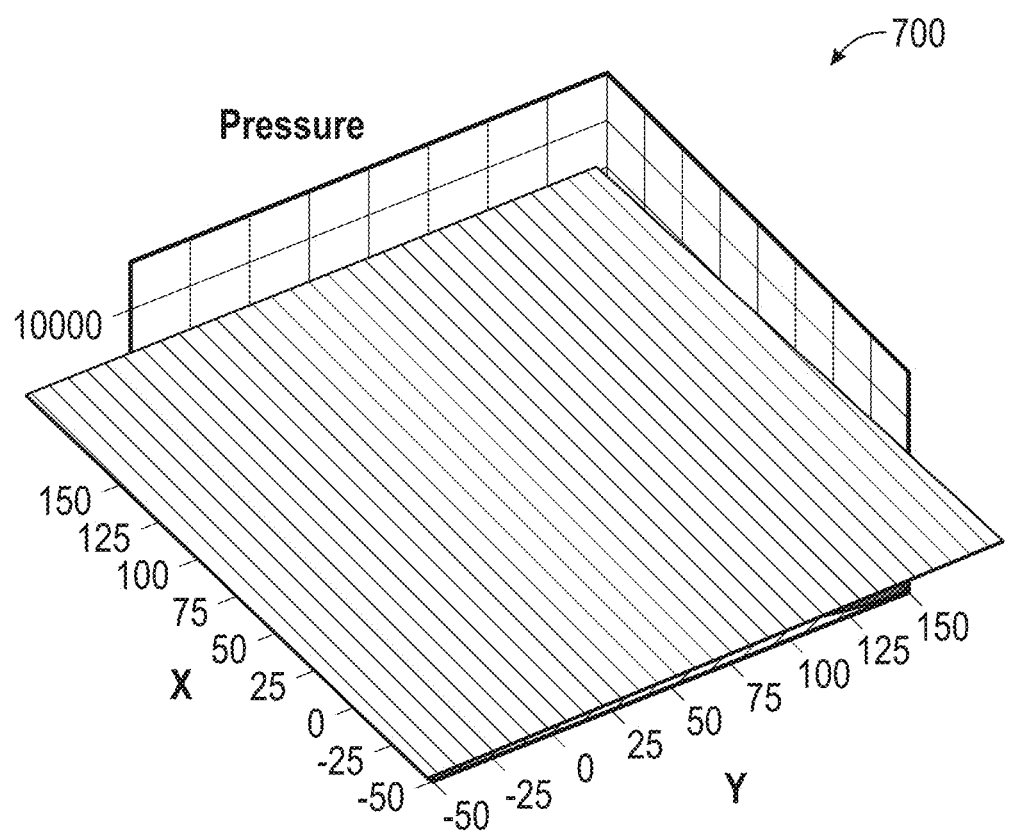
FIG. 7 shows a 3D pressure distribution map that may be generated by a computer based on processing sensor signals received from a set of sensors of an object-sensing mat when an item is removed from the object-sensing mat.

FIG. 7 shows a 3D pressure distribution map 700 that may be generated by the computer 135 based on processing sensor signals received from a set of sensors when all items have been removed from the object-sensing mat 130. In this example, no "hills" are present in the 3D pressure distribution map 700, where a "hill" corresponds to a pressure distribution (weight distribution) of an individual item placed upon the object-sensing mat 130. A set of "hills" will be present when a number of items are present on the object-sensing mat 130. Each "hill" will disappear as each item is removed from the object-sensing mat. In some cases, more than one "hill" may disappear thereby providing to the computer 135, an indication that more than one item has been removed from the object-sensing mat 130 in a concurrent manner.

Figure 8:
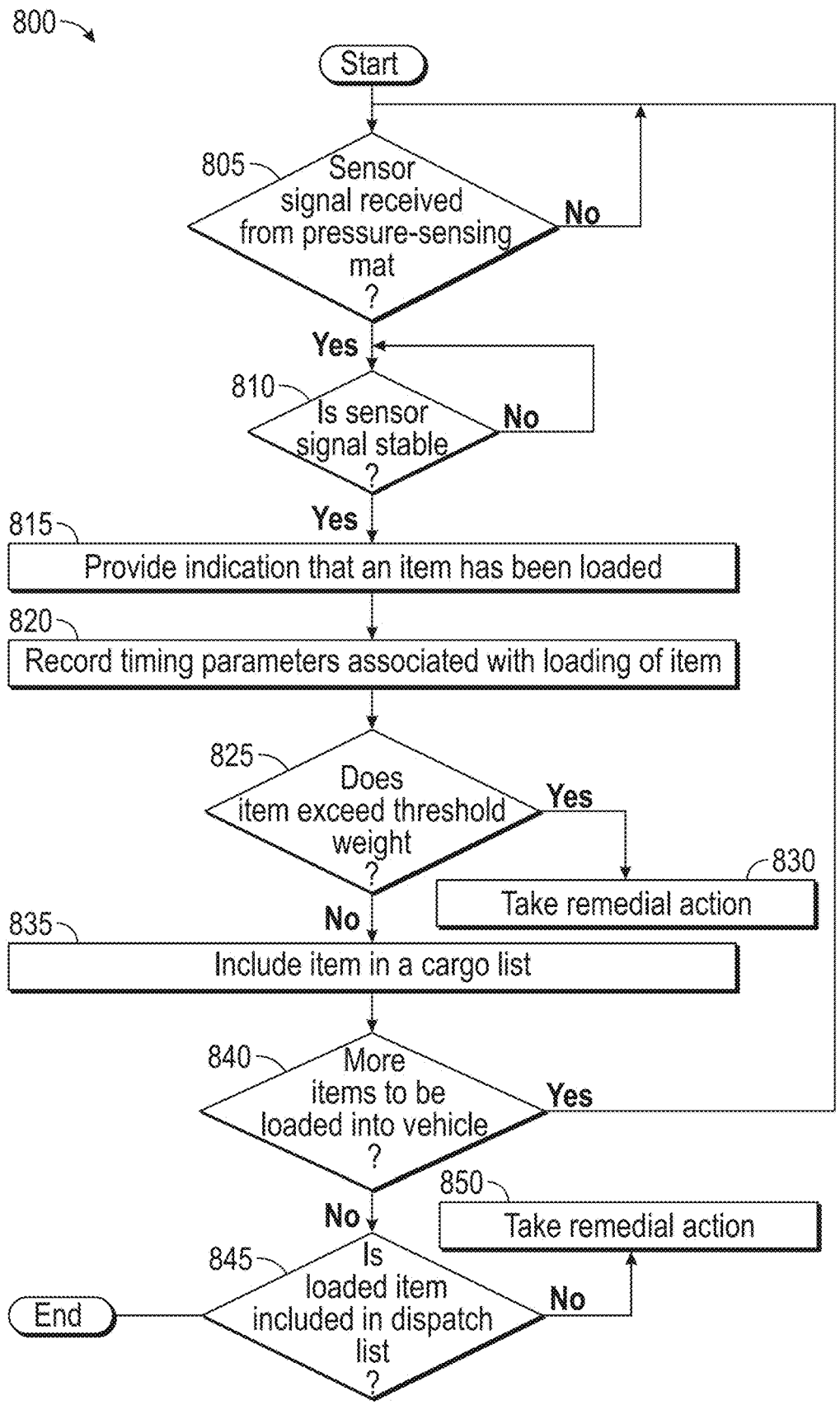
FIG. 8 illustrates an example flowchart of a method for evaluating timing characteristics associated with loading and/or unloading items in a vehicle in accordance with the disclosure.

FIG. 8 illustrates an example flowchart 800 of a method for evaluating timing characteristics associated with loading items into the vehicle 100 in accordance with the disclosure. The flowchart 800 illustrates a sequence of operations that can be implemented in hardware, software, or a combination thereof. In the context of software, the operations represent computer-executable instructions stored on one or more non-transitory computer-readable media such as the memory 220 and the memory 245, which, when executed by one or more processors such as the processor 215 and the processor 240 perform the recited operations. More particularly, some or all of the computer-executable instructions can be embodied in the form of the timing evaluation module 221 and the timing evaluation module 246 described herein.

Generally, computer-executable instructions include routines, programs, objects, components, data structures, and the like that perform particular functions or implement particular abstract data types. The order in which the operations are described is not intended to be construed as a limitation, and any number of the described operations may be carried out in a different order, omitted, combined in any order, and/or carried out in parallel. The various objects that are included in other figures are used below for purposes of description. However, it must be understood that the description is equally applicable to other objects in various other embodiments.

At block 805, a determination is made whether the computer 135 has received a sensor signal from the object-sensing mat 130 during the time period "t1" through "t1" that is shown in the graph 400 that is described above. If no sensor signal has been received, the computer 135 continues to wait. If a sensor signal has been received, at block 810, a determination is made by the computer 135 whether the sensor signal has stabilized. Stabilization of the sensor signal corresponds to the time period "t2" through "t3" in the graph 400 and is indicative of an item having been placed upon the object-sensing mat 130. If the sensor signal is not stable, the computer 135 continues to wait for a stable signal. If the sensor signal is stable, at block 815, the computer 135 may provide an indication that an item has been loaded on to the pressure-sensitive mat 130, such as, for example, by flashing a dome light in the cargo section 110 of the vehicle 100.

At block 820, one or more timing parameters associated with loading the item on to the object-sensing mat 130 may be recorded by the computer 135. The timing parameters may be used for various purposes such as, for example, to generate a timing prediction model. At block 825, a determination is made whether the item exceeds a threshold weight. The threshold weight may be specified by any of various entities, such as, for example, an operator of a freight service that operates the vehicle 100 or a customer who has purchased the item. If the weight of the item is more than the threshold weight, at block 830, remedial action is taken. The remedial action may be taken by various entities such as, for example, the operator of the freight service. The operator may, for example, decide to repackage the item into two or more packages, or may decide to ship the item through a different vehicle. If the weight of item is less than the threshold weight, at block 835, the item may be included in a cargo list and/or the inventory database 222 updated.

At block 840, a determination may be made whether more items are to be loaded into the vehicle 100. In one example case, the determination may be carried out by the processor 215 processing purchasing information stored in the client database 224. If more items have to be loaded, the actions indicated in block 805 and subsequent blocks are re-executed. If no more items are to be loaded into the vehicle 100, at block 845, a determination is made whether the item that has been loaded is included in a dispatch list. If the item is not included in a dispatch list, at block 850, remedial action is taken. In one example case, the remedial action may be taken by a grocery store manager. The manager may, for example, contact a customer to clarify the situation, or may decide to remove the item from the vehicle 100. If the item is included in a dispatch list, the flowchart 800 can be terminated because no more items have to be loaded into the vehicle 100 (as indicated at block 840).

Figure 9:
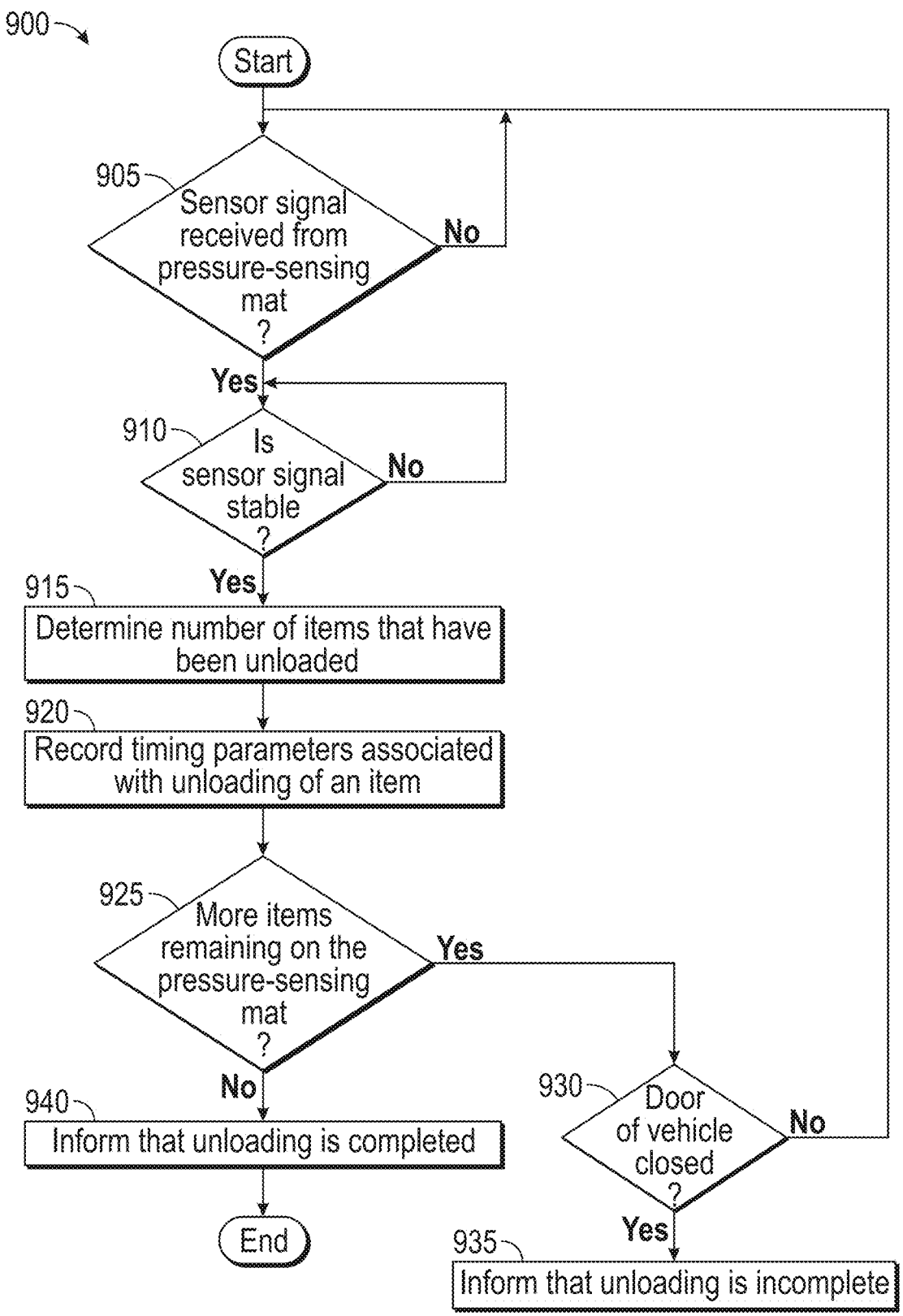
FIG. 9 illustrates an example flowchart of a method for evaluating timing characteristics associated with loading and/or unloading items in a vehicle in accordance with the disclosure.

FIG. 9 illustrates an example flowchart 900 of a method for evaluating timing characteristics associated with unloading items from the vehicle 100 in accordance with the disclosure. At block 905, a determination is made whether the computer 135 has received a sensor signal from the object-sensing mat 130 during the time period "t4" through "t5" that is shown in the graph 600 and described above. If no sensor signal has been received, the computer 135 continues to wait. If a sensor signal has been received, at block 910, a determination is made by the computer 135 whether the sensor signal has stabilized. Stabilization of the sensor signal corresponds to the time period "t5" through "t6" in the graph 600 and is indicative of an item having been removed from the object-sensing mat 130. If the sensor signal is not stable, the computer 135 continues to wait for a stable signal. If the sensor signal is stable, at block 915, the computer 135 may determine the number of items that have been unloaded from the pressure-sensitive mat 130. This operation may be carried out, for example, by evaluating the 3D pressure distribution map 500 and/or the 3D pressure distribution map 700.

At block 920, the computer 135 may record timing parameters associated with unloading of a first item from the vehicle 100. The timing parameters may be used for various purposes such as, for example, to generate a timing prediction model and/or for improving unloading procedures.

At block 925, a determination is made whether any more items are remaining on the object-sensing mat 130. If no items are remaining, at block 940, follow-up actions may be carried out such as, for example, informing an unloading entity that the unloading is completed and/or providing feedback on the performance of the unloading entity. The flowchart 900 may then be terminated. If items are remaining on the object-sensing mat 130 and at block 930, closing of the door 140 of the vehicle 100 is detected, at block 935, alerting actions may be carried out. For example, an unloading entity may be informed (email, text alert etc.) that the unloading has not yet been completed. If the door 140 of the vehicle 100 has not been closed, the computer 135 may decide that additional items have to be unloaded from the vehicle 100. Consequently, the flowchart 900 can be re-executed for evaluating unloading of additional items from vehicle 100.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," "example implementation," etc., indicate that the embodiment or implementation described may include a particular feature, structure, or characteristic, but every embodiment or implementation may not necessarily include the particular feature, structure, or characteristic. Moreover, such phrases are not necessarily referring to the same embodiment or implementation. Further, when a particular feature, structure, or characteristic is described in connection with an embodiment or implementation, one skilled in the art will recognize such feature, structure, or characteristic in connection with other embodiments or implementations whether or not explicitly described. For example, various features, aspects, and actions described above with respect to an autonomous parking maneuver are applicable to various other autonomous maneuvers and must be interpreted accordingly.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device such as the memory 220 and the memory 245, can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such condi- That which is claimed is:

1. A method comprising:
    loading a first item into a vehicle or unloading the first item from the vehicle, wherein loading the first item into the vehicle comprises placing the first item upon an object-sensing mat on a cargo bed of the vehicle and unloading the first item from the vehicle comprises removing the first item from the object-sensing mat;
    sensing a first change in weight or pressure by the object-sensing mat;
    detecting, based on sensing the first change in weight or pressure by the object-sensing mat, the loading of the first item into the vehicle or unloading of the first item from the vehicle; and
    generating, based in part on a first amount of time taken for the loading of the first item into the vehicle or unloading of the first item from the vehicle, a timing prediction model configured to provide information about loading timing characteristics associated with loading or unloading one or more items onto or from the vehicle.

2. The method of claim 1, wherein sensing the first change in weight or pressure by the object-sensing mat comprises sensing a first increase in weight or pressure when the first item is loaded into the vehicle or a first decrease in weight or pressure when the first item is unloaded from the vehicle.

3. The method of claim 1, wherein the vehicle is an autonomous vehicle and the loading of the first item into the vehicle or unloading of the first item from the vehicle is performed by an individual, wherein the individual is a human.

4. The method of claim 3, further comprising:
    loading a second item into the vehicle or unloading the second item from the vehicle, wherein loading the second item into the vehicle comprises placing the second item upon the object-sensing mat and unloading the second item from the vehicle comprises removing the second item from the object-sensing mat;
    sensing a second change in weight or pressure by the object-sensing mat;
    detecting, based on sensing the second change in weight or pressure by the object-sensing mat, the loading of the second item into the vehicle or unloading of the second item from the vehicle; and
    updating, based in part on a second amount of time taken for the loading of the second item into the vehicle or unloading of the second item from the vehicle, the timing prediction model, wherein the second amount of time is indicative of a time period that has lapsed since the loading of the first item into the vehicle or unloading of the first item from the vehicle.

5. The method of claim 4, wherein the updating of the timing prediction model is further based in part on a first footprint of the first item determined by the object-sensing mat and a second footprint of the second item determined by the object-sensing mat.

6. The method of claim 4, wherein the loading of the second item into the vehicle or unloading of the second item from the vehicle is performed by the individual, and wherein the timing prediction model indicates a loading rate or an unloading rate of the individual who one of loads the first item and the second item into the vehicle or unloads the first item and the second item from the vehicle.

7. The method of claim 1, further comprising:
    determining whether a weight of the first item exceeds a threshold weight; and
    performing a remedial action in response to a determination that the weight of the first item exceeds the threshold weight.

8. The method of claim 5, wherein the first footprint and the second footprint indicate a weight distribution of the first item and the second item upon the object-sensing mat, and further comprising:
    relocating one of the first item or the second item on the object-sensing mat based on the weight distribution.

9. A method comprising:
    unloading a first item from a vehicle, comprising removing the first item from an object-sensing mat on a cargo bed of the vehicle;
    unloading a second item from the vehicle, comprising removing the second item from the object-sensing mat;
    detecting the unloading of the first item from the vehicle based on sensing a first change in weight or pressure by the object-sensing mat;
    detecting the unloading of the second item from the vehicle based on sensing a second change in weight or pressure by the object-sensing mat;
    determining a first amount of time that has lapsed between the detecting of the unloading of the first item from the vehicle and the detecting of the unloading of the second item from the vehicle; and
    generating a timing prediction model for unloading items from the vehicle based in part on the first amount of time, wherein the timing prediction model is configured to provide information about loading timing characteristics associated with unloading one or more items from the vehicle.

10. The method of claim 9, wherein sensing the first change in weight or pressure by the object-sensing mat comprises sensing a first decrease in weight or pressure when the first item is unloaded from the vehicle and sensing the second change in weight or pressure by the object-sensing mat comprises sensing a second decrease in weight or pressure when the second item is unloaded from the vehicle.

11. The method of claim 9, wherein the vehicle is an autonomous vehicle and the unloading of the first item and the second item from the vehicle is performed by an individual, wherein the individual is a human.

12. The method of claim 11, wherein the generating of the timing prediction model is further based in part on a first footprint of the first item determined by the object-sensing mat and a second footprint of the second item determined by the object-sensing mat.

13. The method of claim 12, wherein the first footprint and the second footprint indicate a weight distribution of the first item and the second item upon the object-sensing mat.

14. The method of claim 11, wherein the timing prediction model to indicates an unloading rate of the individual who unloads the first item and the second item from the vehicle.

15. The method of claim 14, further comprising:
    determining a physical characteristic or a behavior characteristic of the individual based on the unloading rate.

16. A vehicle comprising:
    an object-sensing mat on a cargo bed of the vehicle;
    a memory that stores computer-executable instructions; and
    a processor configured to access the memory and execute the computer-executable instructions to at least:
        sense a first change in weight or pressure by the object-sensing mat;

detect, based on sensing the first change in weight or pressure by the object-sensing mat, loading of a first item into the vehicle or unloading of the first item from the vehicle; and generate, based in part on a first amount of time taken for the loading of the first item into the vehicle or unloading of the first item from the vehicle, a timing prediction model configured to provide information about loading timing characteristics associated with loading or unloading one or more items onto or from the vehicle.

17. The vehicle of claim 16, wherein generating the timing prediction model is further based in part on a footprint of the first item determined by the object-sensing mat.

18. The vehicle of claim 17, wherein the footprint indicates a weight distribution of the first item upon the object-sensing mat.

19. The vehicle of claim 16, wherein the processor is further configured to access the memory and execute additional computer-executable instructions to at least:

determine a loading rate or an unloading rate of an individual who loads the first item into the vehicle or unloads the first item from the vehicle, wherein the timing prediction model is generated to indicate the loading rate or the unloading rate of the individual.

20. The vehicle of claim 16, wherein the object-sensing mat is a pressure mat or a force-sensing resistive mat.

* * * * *